United States Patent [19]

Hull

[11] E Re. 29,510

[45] Reissued Jan. 3, 1978

[54] HIGH EFFICIENCY SWITCHING DRIVE FOR A RESONATE POWER TRANSFORMER

[75] Inventor: George Robert Hull, Beaverton, Oreg.

[73] Assignee: Tektronix, Inc., Beaverton, Oreg.

[21] Appl. No.: 749,582

[22] Filed: Dec. 10, 1976

Related U.S. Patent Documents

Reissue of:

[64] Patent No.: 3,987,355
Issued: Oct. 19, 1976
Appl. No.: 561,740
Filed: Mar. 24, 1975

[51] Int. Cl.[2] ..... H02M 7/537

[52] U.S. Cl. ..... 363/21; 331/112; 331/117 D

[58] Field of Search ..... 321/2, 18, 43, 44, 46; 323/17, 22 T, 60, 61; 331/112, 117 D

[56] References Cited

U.S. PATENT DOCUMENTS

| | | | |
|---|---|---|---|
| 3,443,194 | 5/1969 | Cielo | 321/2 |
| 3,753,075 | 8/1973 | Tomura | 331/117 D |
| 3,831,079 | 8/1974 | Iwata | 321/2 |
| 3,889,173 | 6/1975 | Klusmann et al. | 321/2 |

*Primary Examiner*—Gerald Goldberg
*Attorney, Agent, or Firm*—Kenneth M. Durk

[57] ABSTRACT

A high efficiency switching drive for a resonate power transformer having the ability to maintain a constant output voltage over a wide range of source voltage variation while maintaining good power conversion efficiency is provided. A transistorized class-C oscillator has means to saturate the transistors during conduction time to allow the transistor voltage to remain small as opposed to a current source as in the conventional class-C oscillator.

6 Claims, 4 Drawing Figures

HIGH EFFICIENCY SWITCHING DRIVE FOR A RESONATE POWER TRANSFORMER

Matter enclosed in heavy brackets [ ] appears in the original patent but forms no part of this reissue specification; matter printed in italics indicates the additions made by reissue.

BACKGROUND OF THE INVENTION

In a portable electrical instrument or similar apparatus high-efficiency operation is axiomatic, especially if such instrument or apparatus derives required power from a DC voltage source such as a battery. Additionally, in electrical instruments or similar apparatus, it is essential to high efficiency operation to maintain a constant output voltage over a wide range of source voltage variation.

Prior art portable electrical instruments as well as standard electrical instruments have included circuits to improve the efficiency of operation. For example, a discussion concerning class-C oscillators and the difficulty of combining high efficiency within a satisfactory degree was presented at the International Convention on Transistors and Associated Semiconductor Devices, May 25, 1959; see The Institution of Electrical Engineers Paper No. 2978E, February 1960, "TRANSISTOR SINEWAVE LC OSCILLATORS" by P. J. Baxandall. However, omitted therefrom is the ability to maintain a constant output voltage over a wide range of source voltage variation while maintaining good power conversion efficiency.

SUMMARY OF THE INVENTION

The subject invention overcomes the disadvantages of the prior art in that a high efficiency switching drive for a resonate power transformer is provided which has the ability to maintain a constant output voltage over a wide range of source voltage variation while maintaining good power conversion efficiency. Basically, a transistorized class-C oscillator (i.e., blocking oscillator) has means to saturate the transistors during conduction time. This allows a high Q transformer to be driven at its natural frequency while maintaining the high power efficiency of a switching converter over a broad range of input voltage and output load variation with a constant output voltage.

It is therefore an object of the present invention to provide a high efficiency switching drive for a resonate power transformer to overcome the disadvantages of the prior art.

It is another object of the present invention to provide an improved DC-to-DC converter having high efficiency.

It is a further object of the present invention to provide a class-C oscillator having high efficiency.

The foregoing and numerous other objects, advantages, and inherent functions of the present invention will become apparent as the same is more fully understood from the following description, which describes the invention; it is to be understood, however, that the various embodiments are not intended to be exhausting nor limiting of the invention but are given for purposes of illustration in order that others skilled in the art may fully understand the invention and principles thereof and the manner of applying it in practical use so that they may modify it in various forms, each as may be best suited to the conditions of the particular use.

DESCRIPTION OF THE INVENTION

Figure 1:
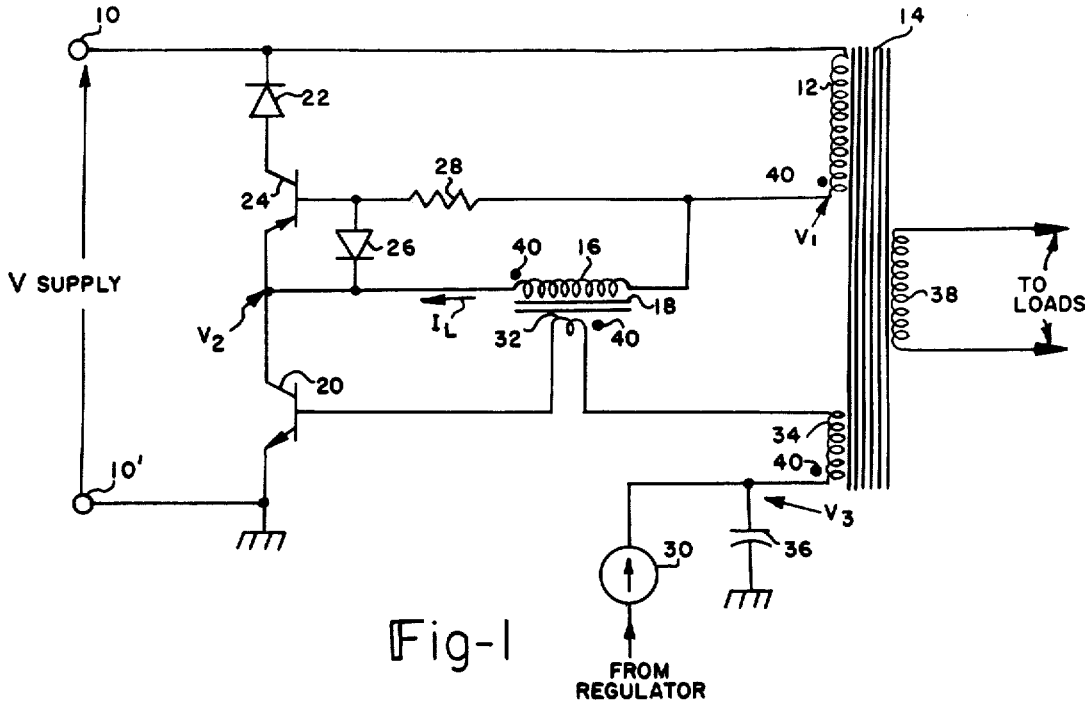
FIG. 1 is the basic circuit according to the present invention.

Referring now to the drawings and in particular to FIG. 1, there is shown the basic circuit of the high efficiency switching drive for a resonate power transformer according to the present invention. Serially disposed between an input terminal 10, to which may be applied a DC voltage or a rectified AC voltage, and a source of reference potential, say, ground is a first winding 12 of a resonate transformer 14, a first winding 16 of a second transformer 18, and the collector-emitter junction of a first transistor 20. Serially disposed between input terminal 10 and the junction between winding 16 and first transistor 20 is a nonsymmetrical conducting device such as the diode 22 and the collector-emitter junction of a second transistor 24. The base of second transistor 24 is also connected to such junction via a nonsymmetrical conducting device such as the diode 26 and to the junction between windings 12, 16 via an impedance means such as a resistor 28 whereas the base of first transistor 20 is connected to a current source 30 via series connected second winding 32 of second transformer 18 and second winding 34 of first transformer 14. A capacitor 36 is connected between the source of reference potential and the junction between current source 30 and second winding 34 of transformer 14. Current source 30 is of the type whereby its output is dependent upon a control signal developed, say, by a conventional regulator circuit. An additional input terminal 10' is connected to the source of reference potential for obvious reasons. The output from the basic circuit is taken across third winding 38 of transformer 14. A plurality of polarity indicators 40 are also shown on the diagram.

Figure 2:
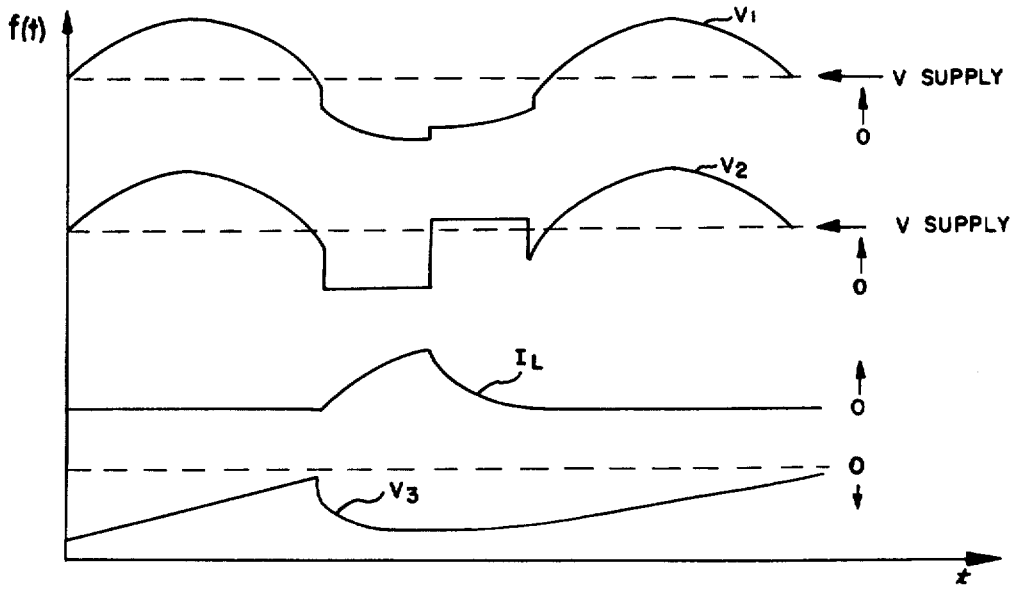
FIG. 2 is the timing diagram for the basic circuit according to FIG. 1.

The basic circuit timing (see FIG. 2) is dependent upon the natural period of transformer 14 and the rate at which capacitor 36 is charged by the regulating circuit. When the sum of the voltage across capacitor 36 and the voltage across second winding 34 of transformer 14 exceeds approximately 0.6 volts, transistor 20 begins to conduct. (It is assumed V supply is applied between terminals 10 and 10'). The conduction current $I_L$ causes an induced voltage into secondary winding 32 of transformer 18 to enhance the turn on of transistor 20. Thus, transistor 20 saturates due to transformer action and becomes a switch rather than a conventional current source in a conventional class-C oscillator. Simultaneously the voltage $V_1$ approaches 0 volts in a sinusoidal manner while transformer action provides power to the secondary load (not shown) connected across winding 38 of transformer 14 whereas winding 16 of transformer 18 stores energy due to the changing current flowing therethrough.

At an instant when $V_1$ is at its most negative position and begins to move positive, the voltage $V_3$ and the voltage across windings 34 and 32 are such that transistor 20 tends to become reversed biased. Instantaneously, the collector voltage $V_2$ of transistor 20 moves positive and due to action of transformer 18 quickly reverse biases transistor 20 completely. Transistor 24 conducts transferring energy stored in winding 16 to transformer 14. In essence, when transistor 24 is switched on, winding 16 is effectively shunted across the winding 12 and energy stored in the winding 16 is utilized to drive the transformer 14. Thus, since existing energy is used to drive the system, the system is more efficient.

As can be discerned from the above, the subject invention is a switching scheme and as such, the semiconductor devices must be fast. Additionally, since transistors 20 and 24 see the peak current pulse, the devices must have betas commensurate at the maximum current expected.

Figure 3:
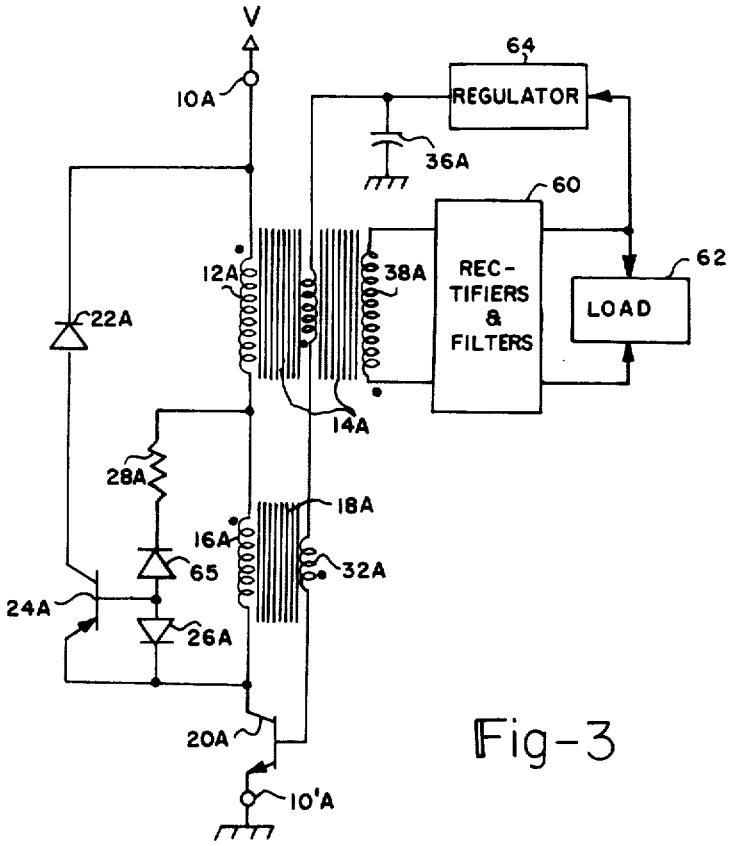
FIG. 3 is a hybrid block and circuit diagram of a system according to present invention.

Shown in FIG. 3 is a system employing the present invention. For convenience, reference numerals common to all embodiments will be used to show equivalence. FIG. 3 is a DC to DC converter made in accordance with the present invention. A load 62 may be, for example, a utilization circuit such as the cathode-ray-tube. The voltage developed across secondary winding 38A is applied to the load 62 via a conventional filter and rectifier means 60. Additionally, feedback to control the system is obtained via the regulator 64 (includes a current source 30). Diode 65 has been added to eliminate power losses of resistor 28A during nonconduction of transistor 24A. Circuit operation is identical to that given for the basic circuit.

Figure 4:
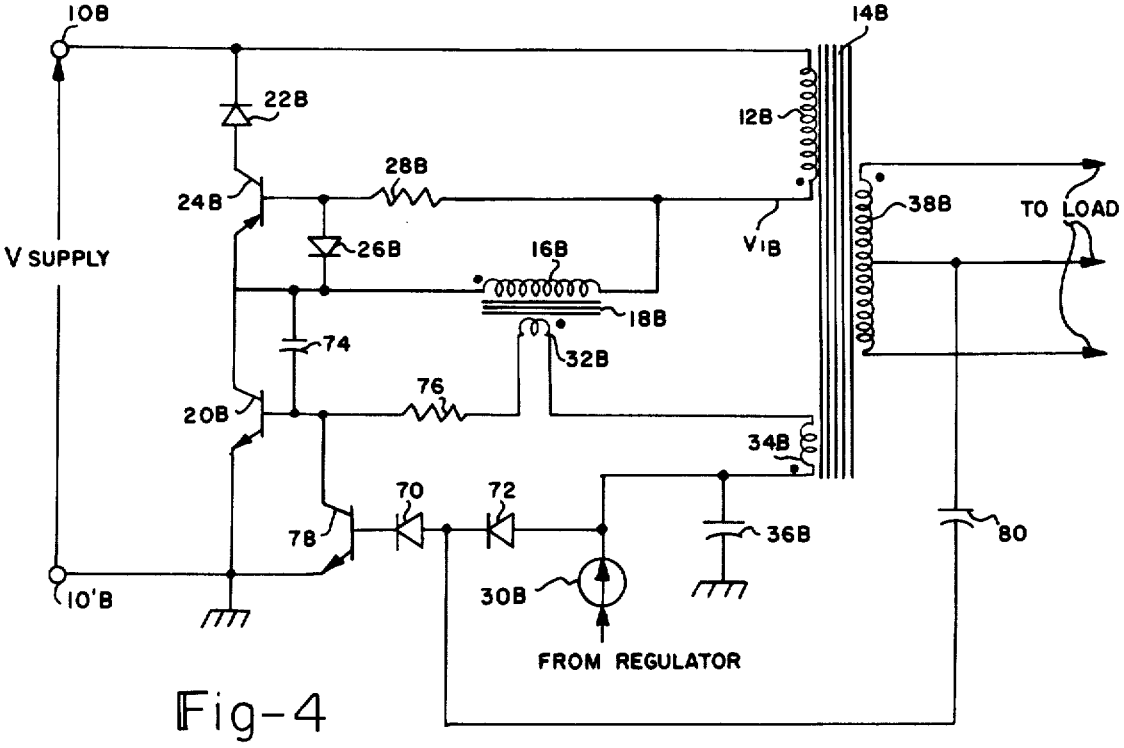
FIG. 4 is an alternative embodiment according to the present invention.

Shown in FIG. 4 is another embodiment according to the present invention. An additional transistor 78 has been disposed across the emitter base junction of transistor 20B. The base of transistor 78 is connected to current source 30B via series connected diode 70, 72 poled so as to steer current into the base of transistor 78 in accordance with the charge on a capacitor 80 disposed between such diodes and winding 38B of transformer 38B. Capacitor 80 can be selectively connected to winding 14B. A resistor 76 has also been added to properly operate transistor 78 whereas the capacitor 74 reduces noise generated by the fast switching action of transistor 20B. In this alternative embodiment, the charge on capacitor 80 is directly proportional to the voltage $V_{IB}$. Thus, the exact point at which switching of transistor 20B is accomplished. Basically, the voltage across winding 38B is sampled which, in turn, provides current shifted in phase from the voltage by 90° to turn transistor 78 on. When transistor 78 conducts, transistor 20B stops conducting as previously explained.

While there has been shown and described the preferred embodiments of the present invention, it will be apparent to those skilled in the art that many changes and modifications may be made without departing from the invention in its broader aspects. For example, any transformer can, with the addition of conventional components be made equivalent to a resonate transformer. Therefore, the appended claims are intended to cover all such changes and modifications that fall within the true spirit and scope of the invention.

The invention is claimed in accordance with the following:

1. A circuit for improving the efficiency of an energy conversion apparatus, comprising:

a resonate transformer having primary windings and secondary windings electromagnetically coupled thereto for converting the energy;

means, coupled to said primary windings, for storing energy [developed by said primary windings];

first switch means coupled to said means for storing energy, said first switch means having a first condition and a second condition;

means for impressing a potential of an external energy source across said primary windings and said means for storing energy in said first condition of said first switch means; and second switch means coupled to said primary windings and operatively disposed across said means for storing energy in said second condition of said first switch means for impressing energy stored in said first condition to said primary windings thereby improving efficiency of the apparatus.

2. The circuit according to claim 1 further comprising feedback means operatively disposed between said second windings and said first switch means for controlling said first switch means.

3. The circuit according to claim 2 wherein said feedback means determines said first and second conditions of said first switch means.

4. The circuit according to claim 1 wherein said first switch means defines a blocking oscillator containing an oscillating transistor.

5. The circuit according to claim 1 wherein said means for storing energy defines a transformer winding connected to said primary winding.

6. The circuit according to claim 1 wherein said second switch means defines an amplifier means including a switching transistor.

* * * * *